United States Patent
Kim et al.

(10) Patent No.: US 10,236,549 B2
(45) Date of Patent: Mar. 19, 2019

(54) LITHIUM AIR BATTERY AND METHOD OF MANUFACTURING THE SAME

(71) Applicant: Samsung Electronics Co., Ltd., Suwon-si, Gyeonggi-do (KR)

(72) Inventors: Taeyoung Kim, Seoul (KR); Hyukjae Kwon, Suwon-si (KR); Kihyun Kim, Seoul (KR); Dongjoon Lee, Suwon-si (KR); Hyunpyo Lee, Seoul (KR); Heungchan Lee, Seongnam-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 655 days.

(21) Appl. No.: 14/953,520

(22) Filed: Nov. 30, 2015

(65) Prior Publication Data
US 2016/0344079 A1 Nov. 24, 2016

(30) Foreign Application Priority Data
May 18, 2015 (KR) ........................ 10-2015-0069118

(51) Int. Cl.
*H01M 12/08* (2006.01)
*H01M 4/86* (2006.01)
*H01M 4/134* (2010.01)
*H01M 4/38* (2006.01)

(52) U.S. Cl.
CPC ........... *H01M 12/08* (2013.01); *H01M 4/382* (2013.01); *H01M 4/8605* (2013.01); *H01M 4/8636* (2013.01); *H01M 4/8657* (2013.01); Y02E 60/128 (2013.01)

(58) Field of Classification Search
CPC ............. H01M 4/8605; H01M 4/8626; H01M 4/8636; H01M 4/8647; H01M 4/8652; H01M 4/8657; H01M 2004/8689; H01M 4/96
See application file for complete search history.

(56) References Cited

U.S. PATENT DOCUMENTS

| | | | |
|---|---|---|---|
| 6,632,557 B1 | 10/2003 | Curelop et al. | |
| 8,932,771 B2 | 1/2015 | Visco et al. | |
| 2007/0172739 A1* | 7/2007 | Visco | H01M 12/08 429/322 |
| 2013/0011750 A1* | 1/2013 | Kim | H01M 12/08 429/405 |
| 2013/0171527 A1* | 7/2013 | Lanning | H01M 4/861 429/405 |

(Continued)

FOREIGN PATENT DOCUMENTS

| | | | |
|---|---|---|---|
| JP | 2014-075269 A | | 4/2014 |
| JP | 2014075269 A | * | 4/2014 |

OTHER PUBLICATIONS

Zhang et al., "Ambient operation of Li/Air Batteries", Journal of Power Sources, vol. 195, 2010, pp. 4332-4337.

*Primary Examiner* — Carlos Barcena
(74) *Attorney, Agent, or Firm* — Cantor Colburn LLP (57) ABSTRACT

A lithium air battery includes: a composite cathode including a porous material and a first electrolyte; an anode including lithium metal, and an oxygen blocking layer disposed between the composite cathode and the anode, wherein a weight ratio of the porous material and the first electrolyte in the composite cathode is less than about 1:3. Also a method of manufacturing the lithium air battery.

20 Claims, 3 Drawing Sheets

(56) References Cited

U.S. PATENT DOCUMENTS

2013/0309572 A1\* 11/2013 Zhang ................. H01M 4/13
                                                    429/217
2014/0093791 A1    4/2014 Suzuki et al.
2017/0012334 A1\*  1/2017 Yamamura ........... H01M 12/06

\* cited by examiner

LITHIUM AIR BATTERY AND METHOD OF MANUFACTURING THE SAME

CROSS-REFERENCE TO RELATED APPLICATION

This application claims priority to and the benefit of Korean Patent Application No. 10-2015-0069118, filed on May 18, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a lithium air battery and a method of manufacturing the same.

2. Description of the Related Art

A lithium air battery generally includes an anode capable of incorporating and deincorporating lithium ions, a cathode that oxidizes and reduces oxygen from the air, and a lithium ion conductive medium disposed between the cathode and the anode.

Since the lithium air battery uses lithium metal as an anode and does not have to store the cathode active material (air) within the battery, the lithium air battery may have a high capacity. A lithium air battery has a high theoretical energy density per unit weight of 3,500 Wh/kg or greater, which is about ten times higher than that of a lithium ion battery.

In the lithium air battery, a large amount of electrolyte is used to fill pores of the cathode, and thus the weight of the whole battery may be high. Accordingly, an energy density of the lithium air battery significantly decreases. Due to limitations of the cathode preparation process, reducing the amount of the electrolyte included in the cathode is difficult.

Therefore, there remains a need for improved methods to reduce the amount of an electrolyte included in a cathode of an air battery.

SUMMARY

Provided is a lithium air battery including a composite cathode, in which a weight ratio of a porous material and a first electrolyte is less that about 1:3.

Provided is a method of manufacturing the lithium air battery.

Additional aspects will be set forth in part in the description which follows and, in part, will be apparent from the description, or may be learned by practice of the presented exemplary embodiments.

According to an aspect, a lithium air battery includes: a composite cathode including first cathode layer comprising a porous material and a first electrolyte; an anode including lithium metal; and an oxygen blocking layer disposed between the composite cathode and the anode, wherein a content of the first electrolyte in the composite cathode is less that about 75 weight percent, based on a total weight of the first electrolyte and the porous material.

According to another aspect, a method of manufacturing a lithium air battery includes: disposing a composite cathode including a first cathode layer including a porous material and a first electrolyte on an oxygen blocking layer; and disposing an anode comprising lithium metal on a surface of the oxygen blocking layer which is opposite the composite cathode to manufacture the lithium air battery, wherein a content of the first electrolyte in the composite cathode is less than about 75 weight percent, based on a total weight of the first electrolyte and the porous material.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to embodiments of a lithium air battery and a method of manufacturing the lithium air battery, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Alkoxy" means an alkyl group that is linked via an oxygen (i.e., alkyl-O—), for example methoxy, ethoxy, and sec-butyloxy groups.

"Alkylene oxide" means an aliphatic C2 to C100 epoxide, for example ethylene oxide, propylene oxide or butylene oxide.

"Aryl" means a monovalent group formed by the removal of one hydrogen atom from one or more rings of an arene (e.g., phenyl or napthyl).

"Aryloxy" means an aryl moiety that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy.

"Cycloalkyl" means a monovalent group having one or more saturated rings in which all ring members are carbon (e.g., cyclopentyl and cyclohexyl).

The prefix "hetero" means that the compound or group includes at least one heteroatom (e.g., 1, 2, or 3 heteroatom(s)), wherein the heteroatom(s) is each independently N, O, S, Si, or P.

According to an exemplary embodiment, a lithium air battery includes a composite cathode including first cathode layer comprising a porous material and a first electrolyte; an anode comprising lithium metal; and an oxygen blocking layer disposed between the composite cathode and the anode, wherein a content of the first electrolyte in the first cathode layer is less than about 75 weight percent, based on a total weight of the first electrolyte and the porous material in the first cathode layer.

The lithium air battery may include a liquid electrolyte and/or a solid electrolyte as the first electrolyte. Operation of the lithium air battery may be represented by a reaction mechanism shown in Reaction Scheme 1.

Reaction Scheme 1

During discharge of the battery, oxygen flows into the composite cathode from the outside and undergoes an oxygen reduction reaction (ORR) with lithium ions derived from the anode to produce a lithium oxide. On the other hand, during charge of the battery, oxidation of the lithium oxide occurs in an oxygen evolution reaction (OER), and lithium ions migrate to the anode and are electrodeposited as lithium metal.

When the content of the first electrolyte in the composite cathode is reduced to less than about 75 weight percent (wt %), based on a total weight of the first electrolyte and the porous material, the lithium air battery including the composite cathode and a reduced amount of the first electrolyte may be easily manufactured. That is, when an amount of the first electrolyte is reduced to about 1 wt % to about 75 wt %, about 2 wt % to about 65 wt %, or about 4 wt % to about 55 wt %, or about 8 wt % to about 45 wt %, based on a total weight of the first electrolyte and the porous material, the lithium air battery having improved charging/discharging characteristics and having a reduced amount of the first electrolyte may be obtained. In an embodiment, the content of the first electrolyte in the first cathode layer is about 1 wt % to about 75 wt %, about 2 wt % to about 65 wt %, or about 4 wt % to about 55 wt %, or about 8 wt % to about 45 wt %, based on a total weight of the first electrolyte and the porous material in the first cathode layer. In an embodiment, the composite cathode may further comprise a second cathode layer on a surface of the first cathode layer which is opposite the oxygen blocking layer. In an embodiment, the content of the first electrolyte in the second cathode layer is about 1 wt % to about 75 wt %, about 2 wt % to about 65 wt %, or about 4 wt % to about 55 wt %, or about 8 wt % to about 45 wt %, based on a total weight of the first electrolyte and the porous material in the second cathode layer. In another embodiment, the second cathode will layer does not comprise an electrolyte. In yet another embodiment, the composite cathode further comprises a third cathode layer on a surface of the second cathode layer which is opposite the oxygen blocking layer. In an embodiment, the content of the first electrolyte in the third cathode layer is about 1 wt % to about 75 wt %, about 2 wt % to about 65 wt %, or about 4 wt % to about 55 wt %, or about 8 wt % to about 45 wt %, based on a total weight of first electrolyte and the porous material in the the third cathode layer. In another embodiment, the third cathode layer does not comprise an electrolyte. In an embodiment, a content of the first electrolyte in the second cathode layer is less than a content of the first electrolyte in the first cathode layer. In yet another embodiment, a content of the first electrolyte in the third cathode layer is less than a content of the first electrolyte in the second cathode layer, and a content of the first electrolyte and the second cathode layer is less than a content of the first electrolyte in the first cathode layer.

Further, since a relative amount of the first electrolyte included in the composite cathode is relatively decreased, squeeze-out of the first electrolyte, which can be pushed outside the cathode by discharge products produced during discharge of the lithium air battery and which does not return back during charge of the lithium air battery, may be reduced.

For example, a content of the first electrolyte in the composite cathode may be about 70 wt % or less, based on a total weight of the first electrolyte and the porous material. For example, a content of the first electrolyte in the composite cathode may be about 65 wt % or less, based on a total weight of the first electrolyte and the porous material. For example, a content of the first electrolyte in the composite cathode may be about 60 wt % or less, based on a total weight of the first electrolyte and the porous material. For example, a content of the first electrolyte in the composite cathode may be about 50 wt % or less by weight, based on a total weight of the first electrolyte and the porous material. For example, a content of the first electrolyte in the composite cathode may be about 10 wt % or greater, based on a total weight of the first electrolyte and the porous material. A content the first electrolyte in the composite cathode may be about 30 wt % or greater, based on a total weight of the first electrolyte and the porous material. In an embodiment, a content of the first electrolyte may be about 10 wt % to about 75 wt %, or about 30 wt % to about 70 wt %, based on a total weight of the first electrolyte and the porous material.

In the composite cathode, when an amount of the first electrolyte is too low, sufficient transfer pathways for lithium ions may not be adequately provided, and thus resistance of the lithium air battery may increase and thus high rate characteristics of the battery may deteriorate. In the composite cathode, when an amount of the first electrolyte is too high, the porous material for storing the discharge products produced during the discharging of the battery decreases, and thus the squeeze-out of the solid electrolyte may increase, which may result in deterioration of capacity and energy density of the battery. Therefore, charging/discharging characteristics of the lithium air battery including the composite cathode having an optimized amount of the first electrolyte may improve.

Further, in the lithium air battery, a content of the first electrolyte in a cathode compartment including the porous material and the first electrolyte may be less than about 75 wt %, based on a total weight of the cathode compartment.

The cathode compartment is defined by a space between a surface of the composite cathode adjacent to a cathode current collector and a surface of the oxygen blocking layer adjacent to the composite cathode. That is, the cathode compartment denotes a space between the cathode current collector and the oxygen blocking layer. Accordingly, when there is no other electrolyte layer between the composite cathode and the oxygen blocking layer, the cathode compartment is defined by the composite cathode only. Further, the cathode compartment may additionally include a composite cathode and an electrolyte layer between the composite cathode and the oxygen blocking layer. For example, a separator including a first electrolyte may be additionally disposed between the composite cathode and the oxygen blocking layer. Therefore, in the lithium air battery, a content of the first electrolyte in the cathode compartment may be less than about 75 wt %, excepting any additionally included an electrolyte between the composite cathode and the oxygen blocking layer, if present.

In a lithium air battery including an anode, a cathode that includes a porous material, and a liquid electrolyte-containing separator disposed between the anode and the cathode, and not including an oxygen blocking layer, an amount of the liquid electrolyte can be about 10 times greater than that of the porous material by weight. In this regard, as a weight of the lithium air battery increases, a specific capacity and an energy density of the lithium air battery decreases. Further, in the lithium air battery not including the oxygen blocking layer, pores of the porous material in the cathode are impregnated with the liquid electrolyte included in the separator, and thus a content of the liquid electrolyte in the cathode or the cathode compartment may be greater than about 75 wt %, based on a total weight of the cathode.

In the lithium air battery not including the oxygen blocking layer, it has been difficult to manufacture the cathode including the porous material and the electrolyte having a content of the electrolyte less than 75 wt %, based on a total weight of the cathode. For example, when a carbon-based porous material and an electrolyte are mixed to provide a content of the electrolyte less than about 75 wt %, a mixture thus obtained may have cracks during a process of molding the mixture, making manufacture of a cathode in the form of a film difficult.

The composite cathode may have a concentration gradient of the first electrolyte from a first surface which is adjacent to the oxygen blocking layer to the second surface which is opposite to the first surface adjacent. That is the first electrolyte is not homogeneously distributed in the composite cathode but inhomogeneously distributed and may have a concentration gradient. When the composite cathode has a concentration gradient, charging/discharging characteristics of the lithium air battery including the composite cathode may improve.

The concentration gradient of the first electrolyte may be continuous or discontinuous. For example, the concentration of the first electrolyte may change continuously or discontinuously from the first surface of the composite cathode to the second surface, which is opposite to the first surface of the composite cathode.

In the composite cathode, a concentration of the first electrolyte at the first surface may be greater than a concentration of the second electrolyte at the second surface. That is, the concentration of the first electrolyte near the first surface of the composite cathode and in contact with the oxygen blocking layer may be greater than a concentration of the first electrolyte near the second surface which is opposite to the first surface. For example, a concentration of the first electrolyte may be constant and greater than 0 at the first surface of the composite cathode, which is adjacent to the oxygen blocking layer, and a concentration of the first electrolyte may be 0 at the second surface of the composite cathode which is in contact with a gas diffusion layer and is opposite to the first surface. The composite cathode may have a concentration of the first electrolyte which is greater than a concentration of the first electrolyte at the first surface, which is adjacent to the oxygen blocking layer, and which is greater than that of the electrolyte at the second surface, which is opposite to the first surface, and thus charging/discharging characteristics of the lithium air battery may be improved.

The composite cathode may have a multi-layer structure including two or more layers. That is, the composite cathode may include a plurality of cathode layers, e.g., 2 to 20 layers, or 3 to 10 layers. For example, the composite cathode may have a two-layer structure, a three-layer structure, or a four-layer structure. When the composite cathode has a multi-layer structure, a concentration of the first electrolyte in the composite cathode may be easily controlled by selecting a different concentration of the first electrolyte for each layer.

The composite cathode may include a first cathode layer having a first surface adjacent to the oxygen blocking layer; and a second cathode layer disposed on the second surface opposite to the first surface of the first cathode layer. For example, the first cathode layer may be disposed on the oxygen blocking layer, the second cathode layer may be disposed on the first cathode layer, and thus the first cathode layer and the second cathode layer may have a multi-layer forming the composite cathode.

In the composite cathode, the first cathode layer may include a porous material and a first electrolyte, and the second cathode layer may include a porous material. That is, the second cathode layer may not include a first electrolyte. For example, a content of the first electrolyte in the first cathode layer 75 wt %, and the second cathode layer may include a porous material only and not include the first electrolyte. In this regard, a content of the first electrolyte may be decreased to less than 75 wt % in the composite cathode.

In the composite cathode, a thickness of the first cathode layer may be in a range of about 1 μm to about 200 μm. For example, a thickness of the first cathode layer may be in a range of about 10 μm to about 100 μm. For example, a thickness of the first cathode layer may be in a range of about 20 μm to about 50 μm. For example, a thickness of the first cathode layer may be in a range of about 30 μm to about 50 μm.

In the composite cathode, a thickness of the second cathode layer may be in a range of about 1 μm to about 200 μm. For example, a thickness of the second cathode layer may be in a range of about 10 μm to about 100 μm. For example, a thickness of the second cathode layer may be in a range of about 20 μm to about 50 μm. For example, a thickness of the second cathode layer may be in a range of about 25 μm to about 50 μm.

In the composite cathode, a thickness of the first cathode layer may be greater than a thickness of the second cathode layer. For example, a thickness of the first cathode layer may be about 50 μm, and a thickness of the second cathode layer may be less than about 50 μm. In the composite cathode, a thickness of the first cathode layer may be greater than a thickness of the second cathode layer, and thus charging/discharging characteristics of the lithium air battery may be improved. In the composite cathode, when a thickness of the first cathode layer is less than a thickness of the second cathode layer, or when a loading amount of the first cathode layer is less than a loading amount of the second cathode layer, an amount of the electrolyte can be too low compared to an amount of the porous material in the composite cathode including the first cathode layer and the second cathode layer, and thus battery performance may deteriorate.

In the lithium air battery including the composite cathode, a capacity retention rate may be about 50% or greater after 19 charging/discharging cycles, when using a cut-off discharge capacity of at 300 milliampere hours per gram (mAh/g) or a cut-off discharge voltage of 1.7 volts (V). For example, a capacity retention rate of the lithium air battery may be about 60% or greater. For example, a capacity retention rate of the lithium air battery may be about 70% or greater. For example, a capacity retention rate of the lithium air battery may be about 80% or greater. For example, a capacity retention rate of the lithium air battery may be about 90% or greater. That is, when a lithium air battery includes the composite cathode, lifespan characteristics of the lithium air battery may significantly improve, and the lithium air battery may have a capacity retention rate of about 60% to about 99%.

In the composite cathode, the first electrolyte may be a solid electrolyte, a liquid electrolyte, or a combination thereof. In an embodiment, the first electrolyte may include a plurality of solid electrolytes, a plurality of liquid electrolytes, or a combination thereof.

The solid electrolyte denotes an electrolyte that is present in a fixed shape maintained at room temperature and has suitable lithium ion conductivity. The liquid electrolyte denotes an electrolyte that has suitable lithium ion conductivity, does not have a fixed shape at room temperature, has a shape that is determined depending on a container containing the liquid, and is capable of flowing.

When the composite cathode includes the liquid electrolyte as the first electrolyte, the composite cathode may be in a solid state or a gel state at room temperature depending on an amount of the porous material and an amount of the binder.

In the composite cathode, the first electrolyte may include an organic solvent, an ionic liquid, a polymeric ionic liquid, an ionic conductive polymer, and an ion conductive inorganic material, or a combination thereof; and a lithium salt. Particularly, the first electrolyte may include an ionic liquid.

Examples of the lithium salt included in the first electrolyte may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ wherein x and y are a natural number, e.g., 1-10), LiCl, LiI, and a combination thereof, but embodiments are not limited thereto, and any suitable lithium salt may be used.

For example, the first electrolyte may be a liquid electrolyte including an organic solvent and a lithium salt, a liquid electrolyte including an ionic liquid and a lithium salt, a solid electrolyte including a polymeric ionic liquid and a lithium salt, a solid electrolyte including an ion conductive polymer and a lithium salt, a solid electrolyte including an ion conductive inorganic material, or a solid electrolyte including an electro-conductive polymer, but embodiments are not limited thereto, and any suitable electrolyte for a cathode of a lithium air battery may be used.

The organic solvent may be any suitable organic solvent of a liquid electrolyte available in the art. For example, the organic solvent may be an aprotic solvent. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, methylpropyl carbonate, ethylpropyl carbonate, methyl isopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, N,N- dimethylsulfoxide, dioxane, 1,2-dimethoxyethane, sulfolane, dichloroethane, chlorobenzene, nitrobenzene, diethylene glycol, dimethylether, or a combination thereof.

A melting point of the ionic liquid may be equal to or lower than room temperature, and the ionic liquid can be a salt in a liquid state at room temperature or a room-temperature molten salt that is formed of ions only.

For example, the ionic liquid (IL) may be a compound represented by Formula 1 or Formula 2:

Formula 1

In Formula 1, denotes a C2-C30 ring having 3 atoms to 31 atoms and including a heteroatom, and can be a C5-C30 cycloalkyl ring, a C6-C30 aryl ring or a C2-C30 heteroaryl ring, wherein X is —N($R_2$)($R_3$), —N($R_2$), —P($R_2$), or —P($R_2$)($R_3$), $Y^-$ is $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, or a combination thereof.

Formula 2

In Formula 2, X is —N($R_2$)($R_3$)($R_4$), —N($R_2$)($R_3$), —P($R_2$)($R_3$), or —P($R_2$)($R_3$)($R_4$), $R_{11}$ is an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group, and $Y^-$ is $BF_4^-$, $PF_6^-$, $ASF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_6SO_2)_2N^-$, $(C_2F_6SO_2)(CF_3SO_2)N^-$, $(CF_3SO_2)_2N^-$, or a combination thereof.

In particular, of Formula 1 may be represented by Formula 3, and of Formula 2 may be represented by Formula 4:

Formula 3

In Formula 3, Z denotes N or P, and $R_{12}$ to $R_{18}$ are each independently a hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group.

Formula 4

In Formula 4, Z denotes N or P, and $R_{12}$ to $R_{15}$ are each independently a hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group.

A substituent of the alkyl group, alkoxy group, heteroaryl group, heteroayloxy group, cycloalkyl group, heterocycloalkyl group, and the alkylene oxide group may be a C1-C5 alkyl group, a C1-C10 alkoxy group, or a C6-C30 aryl group.

In particular, the ionic liquid may be diethylmethyl(2-methoxyethyl)ammonium bis(trifluoromethane sulfonyl) imide) (DEME-TFSI).

The polymeric ionic liquid (PIL) may be prepared by polymerizing ionic liquid monomers or a compound to obtain a polymer. The polymeric ionic liquid may be highly soluble with respect to an organic solvent, and, when added to an electrolyte, an ion conductivity of the electrolyte may improve.

When the polymeric ionic liquid is prepared by polymerizing ionic liquid monomers, the product of the polymerization is washed and dried, and the polymer product has appropriate anions and solubility with respect to an organic solvent through an anion-substitution reaction.

For example, the polymeric ionic liquid may have a repeating unit that includes i) a cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, or a combination thereof; and ii) an anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, $(CF_3SO_2)_2N^-$, or a combination thereof.

For example, the polymer ionic liquid may be prepared by polymerizing an ionic liquid monomer. The liquid monomer may have a functional group that may be polymerized with a vinyl group, an allyl group, an acrylate group, or a methacrylate group and may include a cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, or a combination thereof; and an anion selected from the examples of the anion above.

Examples of the polymeric ionic liquid may include poly(diallyldimethylammoniu mtrifluoromethanesulfonylimide) (poly(diallyldimethylammonium)TFSI), poly(1-allyl-3-methylimidazolium trifluoromethanesulfonylimide), and poly(N-methyl-N-propylpiperidinium bis(trifluoromethanesulfonyl)imide).

The ion conductive inorganic material may include a glass or amorphous metal ion conductor, a ceramic active metal ion conductor, a glass ceramic active metal ion conductor, or a combination thereof, but embodiments are not limited thereto, and any suitable ion conductive inorganic material may be used. The ion conductive inorganic material may be in the form of ion conductive inorganic particles.

For example, the ion conductive inorganic material may comprise $BaTiO_3$, $Pb(Zr_mTi_{(1-m)})O_3$ wherein $0 \leq m \leq 1$ (PZT), $Pb_{1-x}La_xZr_{1-y}Ti_yO_3$ (PLZT) (wherein $0 \leq x<1$ and $0 \leq y<1$), $Pb(Mg_{3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_mGe_{(1-m)})_x(Ti_nGe_{(1-n)})_{2-x}Si_yP_{3-y}O_{12}$ (wherein, $0 \leq m \leq 1$, $0 \leq n \leq 1$, $0 \leq x \leq 1$ and $0 \leq y \leq 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride (e.g., $Li_xN_y$, wherein $0<x<4$ and $0<y<2$), a $SiS_2$-based glass (e.g., $Li_xSi_yS_z$, where $0<x<3$, $0<y<2$, and $0<z<4$), a $P_2S_5$-based glass (e.g., $Li_xP_yS_z$, wherein $0<x<3$, $0<y<3$, and $0<z<7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$-based ceramic, and a garnet-based ceramic, $Li_{3+x}La_3M_2O_{12}$ (wherein, M=Te, Nb, Zr) or a combination thereof.

The ion conductive polymer denotes a polymer including an ion conductive repeating unit in a main chain or a side chain thereof. The ion conductive repeating unit may be any unit that has ion conductivity and, for example, may be an alkylene oxide unit, such as ethylene oxide, and a hydrophilic unit.

For example, the ion conductive polymer may include a conductive repeating unit selected from an ether-based monomer, an acryl-based monomer, a methacryl-based monomer, a siloxane-based monomer, or a combination thereof.

For example, the ion conductive polymer may be polyethyleneoxide, polypropyleneoxide, polymethylmethacrylate, polyethylmethacrylate, polydimethylsiloxane, polyacrylate, polymethacrylate, polymethylacrylate, polyethylacrylate, poly2-ethylhexyl acrylate, polybutyl methacrylate, poly2-ethylhexylmethacrylate, polydecylacrylate, polyethylenevinylacetate, or a combination thereof.

A polymerization product of cross-linking monomers having ion conductivity may be used as the ion conductive polymer. Here, the cross-linking monomers having ion conductivity may be ethoxylate, trimethylolpropane, triacrylate, polyethyleneglycol diacrylate, polyethylene glycol dimethacrylate, or a combination thereof.

Further, the ion conductive polymer may be a polyethylene (PE) derivative, a polyethylene oxide (PEO) derivative, a polypropylene oxide (PPO) derivative, a phosphate ester polymer, a polyester sulfide, a polyvinyl alcohol (PVA), a polyfluorovinylidene (PVdF), and a polymer including an ion dissociating group such as a Li-substituted Nafion (Nafion®), but embodiments are not limited thereto, and any suitable ion conductive polymer may be used.

The composite cathode may include a porous material. The porous material may be a conductive material. The conductive material may be any suitable material having suitable conductivity, and an example of the conductive material may be a carbonaceous material. Examples of the carbonaceous material may include carbon black, graphite, graphene, activated carbon, carbon fiber, or combination thereof. For example, the carbonaceous material may include a carbon nanoparticle, carbon nanotube, carbon nanofiber, carbon nanosheet, carbon nanorod, and carbon nanobelt, but embodiments are not limited thereto, and any suitable carbonaceous material having a nanostructure may be used. The carbonaceous material may be in a microsize, e.g., having a particle size of about 0.01 μm to 100 μm, or about 5 to about 50 μm, as well as having a nanostructure. For example, the carbonaceous material may be in various shapes, that is, particles, tubes, fibers, sheets, rods, and belts, in a micro size, e.g., having a particle size of about 0.01 μm to 100 μm, or about 0.1 μm to 100 μm, or about 1 μm to 100 μm, or about 5 to about 50 μm.

For example, the carbonaceous material may be mesoporous and may have a pore size of about 2 to about 50 nm. For example, the carbonaceous material may be partially porous or porous as a whole. When the carbonaceous material is porous, the cathode may be porous, and thus a porous cathode may be formed. As the carbonaceous material has porosity, a contact area between the cathode and the electrolyte may increase. Further, when the carbonaceous material is porous, oxygen may be easily supplied and diffused in the cathode, and a space for attaching the product of the charging/discharging process may be provided.

Further, a metallic conductive material such as metal fiber or metal mesh may be used as the conductive material. Also, a metallic powder of copper, silver, nickel, or aluminum may be used as the conductive material. An organic conductive material such as a polyphenylene derivative may be used as an organic conductive material. The conduct materials may be used alone or as a mixture thereof.

A catalyst for oxidation/reduction of oxygen may be added to the composite cathode, and examples of the catalyst may include a rare-earth metal-based catalyst such as platinum, gold, silver, palladium, ruthenium, rhodium, or osmium; an oxide-based catalyst such as a manganese oxide, an iron oxide, a cobalt oxide, or a nickel oxide; or an organic metal-based catalyst such as cobalt phthalocyanine, but embodiments are not limited thereto, and any suitable oxygen oxidation/reduction catalyst may be used.

Further, the catalyst may be contained in a carrier. The carrier may be an oxide, a zeolite, a clay mineral, carbon, or a combination thereof. The oxide may include one or more oxides selected from alumina, silica, zirconium oxide, and titanium dioxide. The oxide may include cesium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. The carbon may be carbon black such as ketjen black, acetylene black, channel black, or lamp black; graphite such as natural graphite, artificial graphite, or expanded graphite; active carbon; or carbon fibers, but embodiments are not limited thereto, and any suitable material available as a carrier in the art may be used.

The composite cathode may further include a binder. The binder may include a thermoplastic resin or a thermosetting resin. For example, polyethylene, polyprolylene, polytetrafluoroethylene (PTFE), polyvinylidene fluoride (PVDF), styrene-butadiene rubber, tetrafluoroethylene-perfluoroalkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoroethylene copolymer, ethylene-acrylic acid copolymer or the like may be used alone or as a combination thereof, but the binder is not limited thereto, and any suitable material available as a binder in the art may be used.

In the composite cathode, a weight ratio of the porous material and the binder may be about 1:0.5 or less by weight. That is, in the composite cathode, an amount of the binder may be 50 parts by weight, based on 100 parts by weight of the porous material. For example, in the composite cathode, an amount of the binder may be in a range of about 1 part to about 50 parts by weight, based on 100 parts by weight of the porous material. For example, in the composite cathode, an amount of the binder may be in a range of about 10 parts to about 40 parts by weight, based on 100 parts by weight of the porous material.

The composite cathode may be prepared, for example, by mixing an oxygen oxidation/reduction catalyst, a porous material, a first electrolyte, and a binder; by preparing a composite cathode slurry optionally adding an appropriate solvent to the mixture, and then coating and drying the slurry on a surface of a current collector or an oxygen blocking layer; or by optionally press-molding a current collector or an oxygen blocking layer to improve electrode density. A method of preparing the composite cathode may further include irradiating of light after the coating and drying process.

Further, the composite cathode may optionally include a lithium oxide. Also, optionally, the oxygen oxidation/reduction catalyst or the binder may be omitted.

The current collector may be a porous structure having a net shape or a mesh shape to increase rate of diffusing oxygen, or the current collector may be a porous metal plate of stainless steel, nickel, or aluminum, but embodiments are not limited thereto, and any suitable current collector available in the art may be used. The current collector may be coated with an oxidation resistant metal or an alloy coating layer to prevent oxidation of the current collector.

A gas diffusion layer may be additionally disposed between the current collector and the composite cathode. The gas diffusion layer may include a porous carbonaceous material or a porous metal, but embodiments are not limited thereto, and any suitable material available as a conductive gas diffusion layer may be used. For example, the porous carbonaceous material may comprise a carbon non-woven fiber. The conductive carbonaceous gas diffusion layer has a low density compared to that of a metal, and thus an energy density of a lithium air battery may be improved.

The anode may be, for example, a lithium metal thin film or an alloy based on lithium metal. For example, the alloy based on lithium metal may be an alloy of aluminum, tin, magnesium, indium, calcium, titanium, vanadium, or a combination thereof with lithium.

Further, a separator may be further disposed between the cathode and the anode. The separator may be any suitable separator having a composition which may be used in a lithium air battery. For example, a polymer non-woven fabric such as a polypropylene non-woven fabric or a polyphenylene sulfide non-woven fabric, a porous film of an olefin resin such as polyethylene or polypropylene, or a combination thereof may be used.

For example, the separator may have a multi-layer structure including at least two layers of polyethylene, polypropylene, or polyvinylidene fluoride, and a mixed multi-layer structure may be used, wherein examples of the mixed multi-layer structure may include a two-layer separator of polyethylene/polypropylene, a three-layer separator of polyethylene/polypropylene/polyethylene, and a three-layer separator of polyprolyene/polyethylene/polypropylene.

The separator may be impregnated with a liquid electrolyte. The liquid electrolyte may be any suitable liquid electrolyte that is available as a first electrolyte.

The oxygen blocking layer disposed between the composite cathode and oxygen may be substantially or effectively impervious to oxygen. The oxygen blocking layer may have an oxygen transmission rate of about 0.01 $cm^3$ per square meter per 24 hours ($cc/m^2/24$ hrs) to about 1000 $cc/m^2/24$ hrs, or about 0.1 to about 100 $cc/m^2/24$ hrs. For example, the oxygen blocking layer may have an oxygen transmission rate of less than about 1000 $cm^3$ per square meter per 24 hours ($cc/m^2/24$ hrs), or less than about 100 $cc/m^2/24$ hrs, or less than about 50 $cc/m^2/24$ hrs, or less than about 10 $cc/m^2/24$ hrs, or less than about 5 $cc/m^2/24$ hrs, or less than about 1 cc/m²/24 hrs. An oxygen transmission rate can be measured according to ASTM D3985. The oxygen blocking layer is a lithium ion conductive solid electrolyte layer that may serve as a protection layer, which prevents impurities such as oxygen included in a cathode electrolyte from directly reacting with a lithium metal anode.

Examples of the lithium ion conductive solid electrolyte layer that is impervious to oxygen may include an inorganic material containing a conductive glass, conductive crystals (ceramic or glass-ceramic) or a combination thereof, but embodiments are not limited thereto, and any suitable solid electrolyte that has suitable conductivity and is effectively impervious to oxygen and is capable of protecting an anode may be used. In consideration of chemical stability, the conductive solid electrolyte layer may be an oxide.

When the conductive solid electrolyte layer includes a large amount of conductive crystals, the electrolyte layer may have high ion conductivity, and thus an amount of the conductive crystals included in the solid electrolyte layer may be, for example, about 50 weight percent (weight %) or higher, about 55 weight % or higher, or about 60 weight %, or about 50 weight % to about 90 weight %, based on the total weight of the solid electrolyte.

The conductive crystals may be crystals having a perovskite structure and having suitable ionic conductivity and may comprise $Li_3N$, LISICON, $La_{0.55}Li_{0.35}TiO_3$, $LiTi_2P_3O_{12}$ having a NASICON type structure, or a glass-ceramic that extracts the crystals thereof.

For example, the conductive crystals may comprise $Li_{1+x+y}(Al_mGa_{(1-m)})_x(Ti_nGe_{(1-n)})_{2-x}Si_yP_{3-y}O_{12}$ (wherein 0≤m≤1, 0≤n≤1, 0≤x≤1 and 0≤y≤1, for example, 0≤x≤0.4 and 0<y≤0.6, or 0.1≤x≤0.3 and 0.1<y≤0.4). In order to increase ion conductivity of the conductive crystals, the conductive crystals should not have grain boundaries that interrupt ion conduction. For example, the glass-ceramic desirably has almost no pores or grain boundaries that interrupt ion conduction and thus may have high ion conductivity and good chemical stability.

The conductive glass-ceramic may comprise, for example, a lithium-aluminum-germanium-phosphate (LAGP) salt, a lithium-aluminum-titanium-phosphate (LATP) salt, a lithium-aluminum-titanium-silicon-phosphate (LATSP) salt, or a combination thereof.

For example, when the glass has a $Li_2O$—$Al_2O_3$—$TiO_2$—$SiO_2$—$P_2O_5$-based composition and is crystallized by heat-treatment, a primary crystal phase of the conductive crystals may be $Li_{1+x+y}Al_xTi_{2-x}Si_yP_{3-y}O_{12}$ (0≤x≤1, and 0≤y≤1), and, for example, x and y may satisfy 0≤x≤0.4 and 0<y≤0.6, or 0.1≤x≤0.3 and 0.1<y≤0.4.

Here, the pores or grain boundaries that interrupt ion conduction denote an ion conduction interrupting material such as holes or grain boundaries that decreases a total conductivity of an inorganic material including conductive crystals to a value of 1/10 or lower with respect to a conductivity of the conductive crystals contained in the inorganic material.

For example, the oxygen blocking layer may comprise $Li_{1+x+y}Al_xTi_{2-x}Si_yP_{3-y}O_{12}$ (wherein 0≤x≤1 and 0≤y≤1). Here, x and y may satisfy, for example, 0≤x≤0.4 and 0<y≤0.6, or 0.1≤x≤0.3 and 0.1<y≤0.4. For example, the oxygen blocking layer includes $Li_{1+x+y}Al_x(Ti_nGe_{(1-n)})_{2-x}Si_yP_{3-y}O_1$ wherein 0≤n≤1, 0≤x≤2 and 0≤y≤3, for example, the oxygen blocking layer may comprise a solid electrolyte layer including LATP (e.g., $Li_{1.4}Ti_{1.6}Al_{0.4}P_3O_{12}$).

The lithium air battery may further include an anode interlayer that is disposed between the anode and the oxygen blocking layer. The anode interlayer may include a second electrolyte. The anode interlayer may be disposed in the lithium air battery to prevent side reaction occurring between the anode and the oxygen blocking layer.

The anode interlayer may include an ion conductive polymer electrolyte as the second electrolyte. For example, the ion conductive polymer electrolyte may comprise a lithium salt-doped polyethylene oxide (PEO), wherein examples of the lithium salt may include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or a combination thereof.

The anode interlayer may further include inorganic particles. The inorganic particles may comprise any suitable inorganic particle, and may include $SiO_2$, $TiO_2$, ZnO, $Al_2O_3$, $BaTiO_3$, a silsesquioxane having a cage structure, or a combination thereof. The silsesquioxane having a cage structure may be polyhedral oligomeric silsesquioxane (POSS). In this regard, when the anode interlayer further includes inorganic particles, the electrolyte may have improved mechanical properties.

An average particle diameter of the inorganic particles may be less than 100 nm. For example, an average diameter of the inorganic particles may be in a range of about 1 nm to about 100 nm. For example, an average particle diameter of the inorganic particles may be in a range of about 5 nm to about 100 nm. For example, an average particle diameter of the inorganic particles may be in a range of about 10 nm to about 100 nm. For example, an average particle diameter of the inorganic particles may be in a range of about 10 nm to about 70 nm. For example, an average particle diameter of the inorganic particles may be in a range of about 30 nm to about 70 nm. When the average particle diameter of the inorganic particles is within these ranges, the electrolyte including the inorganic particles may easily form a layer without a decrease in ion conductivity and may have good mechanical properties.

In the anode interlayer, an amount of the inorganic particles may be in a range of about 1 weight % to about 30 weight %, about 2 weight % to about 25 weight %, or about 4 weight % to about 20 weight %, based on the total weight of the anode interlayer, but embodiments are not limited thereto, and the amount of the inorganic particles may be appropriately selected.

The lithium air battery may be used as a lithium primary battery or a lithium secondary battery. Also, a shape of the lithium air battery is not limited, and examples of the shape of the lithium air battery may include coin, button, sheet, stack, cylinder, flat, or cone. Also, the lithium air battery may be a large-sized battery that is used in an electric vehicle.

Figure 1:
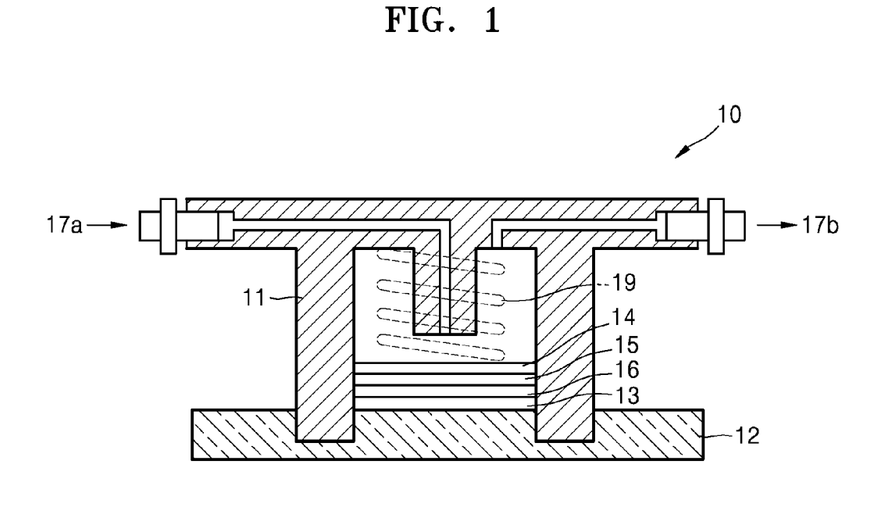
FIG. 1 is a schematic view illustrating a structure of an embodiment of a lithium air battery.

An embodiment of a lithium air battery 10 is schematically shown in FIG. 1. The lithium air battery 10 includes a composite cathode 15 that is in contact with a first current collector 14 and uses oxygen as an active material; an anode 13 that is in contact with a second current collector 12 and includes lithium; and an oxygen blocking layer 16 adjacent to the anode 13 including lithium. An anode interlayer may be further disposed between the anode 13 and the oxygen blocking layer 16. Although not shown in FIG. 1, the composite cathode 15 may have a multi-layer structure including a first cathode layer and a second cathode layer.

The first current collector 14 is porous and may serve as a gas diffusion layer, through which air may diffuse. Porous carbon paper may be further disposed between the first current collector 14 and the cathode 15 as a gas diffusion layer. A pressing member 19 is disposed on the first current collector 14 to move air to an air electrode.

A case 11 formed of an insulating resin material is disposed between the composite cathode 15 and the anode to electrically disconnect the cathode 15 and the anode 13. Air is supplied through an air inlet 17a and discharged through an air outlet 17b. The lithium air battery may be accommodated in a stainless steel reactor.

As used herein, the term "air" is not limited to the atmospheric air but may include a combination of gases including oxygen or a pure oxygen gas. The term "air" having wide scope of the definition may be applied to an air battery, air, or an air electrode.

According to another embodiment, a method of preparing a lithium air battery may include disposing a composite cathode including a porous material and an electrolyte on an oxygen blocking layer, wherein a content the electrolyte in the composite cathode is less than 75 wt %, based on a total weight of the first electrolyte and the porous material.

For example, the method may include disposing a first cathode layer including the porous material and the electrolyte on the oxygen blocking layer; and disposing a second cathode layer including a porous material on the first cathode layer, wherein a content of the electrolyte in the composite cathode including the first cathode layer and the second cathode layer may be less than 75 wt %, based on a total weight of the first electrolyte and the porous material.

The oxygen blocking layer may be an ion conductive solid electrolyte layer as described above. For example, the ion conductive solid electrolyte layer may be a LATP substrate.

A method for disposing the composite cathode is not particularly limited, and the composite cathode may be disposed by any suitable method, such as coating and drying, depositing, and sputtering depending on a type of the oxygen blocking layer, and any suitable method available as the method of disposing the composite cathode in the art may be used.

For example, the first cathode layer including a porous material, an electrolyte, and a binder may be disposed on a LATP substrate, and the second cathode layer including a porous material and a binder may be disposed on the first cathode layer to prepare the composite cathode. A content of the electrolyte in the composite cathode may be less than 75 wt %, based on a total weight of the first electrolyte and the porous material.

The first cathode layer may be prepared by mixing a porous material, an electrolyte, and a binder to prepare a paste for a first cathode layer; coating, pressing, and drying the paste for a first cathode layer on a substrate; and separating the paste from the substrate. A content of the electrolyte in the first cathode layer may be 75 wt % or less, based on a total weight of the first electrolyte and the porous material in the first cathode layer.

The second cathode layer may be prepared by mixing a porous material, a solvent, and a binder to prepare a paste for a second cathode layer; coating, pressing, and drying the paste for a second cathode layer on a substrate; and separating the paste from the substrate. The second cathode layer may not include an electrolyte.

The method may further include heat-treating after the drying of the second cathode layer. A remaining solvent may be all removed by the heat-treating. Each of the first cathode layer and the second cathode layer thus prepared may be a free standing film.

The coating of the paste may be performed by casting, spraying, doctor blade, printing, spin coating, spray coating, dip coating, or knife coating. In some embodiments, the coating of the paste may be performed by spin coating.

The drying of the paste may be performed at a temperature in a range of room temperature (e.g., 20° C.) to about 150° C., or about 25° C. to about 125° C., for about 1 hour to about 24 hours, or about 2 hours to about 20 hours. The drying process may be performed under vacuum condition. The vacuum condition may be in a range of about 0.1 torr to about 1 torr. The method may further include a heat-treating process in an inert atmosphere at a temperature in a range of about 200° C. to about 400° C.

For example, a lithium air battery may be prepared as follows.

First, as described above, a composite cathode/oxygen blocking layer structure including the composite cathode, in which the first cathode layer and the second cathode layer are sequentially stacked on the oxygen blocking layer, is prepared.

Next, an anode, which is a lithium metal thin layer, is disposed on one side in the case, the anode interlayer, which is a polymer electrolyte film, is disposed on the anode, and a composite cathode/oxygen blocking layer structure is disposed on the anode interlayer.

Subsequently, a carbon paper gas diffusion layer and a nickel (Ni) mesh current collector are sequentially stacked on the composite cathode, and the cell is fixed by pressing with a pressing member on the stack to transfer air into an air electrode, thereby completing manufacture of a lithium air battery.

The case may have an upper part in contact with the anode and a lower part in contact with the air electrode, wherein an insulating resin is disposed between the upper part and the lower part so that the air electrode and the anode are electrically insulated.

Thereinafter, an embodiment is described in further detail with reference to the following examples. However, these examples shall not limit the scope of this disclosure.

EXAMPLES (Preparation of Composite Cathode/Oxygen Blocking Layer Structure)

Example 1: Preparation of Composite Cathode/Oxygen Blocking Layer (Carbon:Electrolyte=1:1.22)

A carbonaceous porous material, multiwall carbon nanotubes (MWCNTs) (XNA-UP-11100, available from Xinnano), an ionic liquid electrolyte prepared by dissolving a 0.5 molar (M) of a lithium salt, lithium bis(trifluoromethane sulfonyl) imide (LiTFSI) in an ionic liquid, diethylmethyl (2-methoxyethyl)ammonium bis(trifluoromethane sulfonyl) imide (DEME-TFSI), and a polytetrafluoroethylene (PTFE) binder (powder, 35 μm, available from Sigma-Aldrich) were prepared at a weight ratio of 1:3:0.2.

The binder and the ionic liquid were mixed in an agate mortar, and a carbonaceous porous material was added thereto to prepare a first paste.

The first paste thus prepared was coated between two sheets of polytetrafluoroethylene (PTFE) films, and an interval between the PTFE films was reduced by using a roll-press to prepare a first cathode layer of a free standing film. A thickness of the first cathode layer was 31 μm.

Carbon black (Printex®, Orion Engineered Chemicals, USA) was vacuum-dried at a temperature of 120° C. for 24 hours. The dried carbon black and the PTFE binder were prepared at a weight ratio of 1:0.2. Propylene glycol was added as a solvent into the prepared carbon black and the PTFE binder, and the mixture was mixed in an agate mortar to prepare a second paste.

The second paste thus prepared was coated between two sheets of PTFE film, and an interval between the PTFE films was reduced by using a roll-press to prepare a free standing film having a thickness of 30 μm. The free standing film was dried at room temperature (20° C.) for 12 hours and then heat-treated in a nitrogen atmosphere at 300° C. to remove the remaining solvent, and thus a second cathode layer was prepared.

The first cathode layer and the second cathode layer were sequentially disposed on an inorganic lithium ion conductor LICGC™ (LATP, Ohara company, Japan, a thickness of 250 μm), which is used as an oxygen blocking layer, and thus a composite cathode/oxygen blocking layer structure was prepared.

A loading amount of the composite cathode including the first cathode layer and the second cathode layer was 3.15 mg/cm$^2$, and the total thickness of the composite cathode was about 61 μm. In the composite cathode including the first cathode layer and the second cathode layer, a weight ratio of the porous material (a carbonaceous material=MWCN+carbon black) to the electrolyte (an ionic liquid electrolyte) was 1:1.22.

Example 2: Preparation of Composite Cathode/Oxygen Blocking Layer Structure (Carbon:Electrolyte=1:1.487)

A stack structure was prepared in the same manner as in Example 1, except that a weight ratio of the porous material to the electrolyte in the whole composite cathode was changed to 1:1.487.

Example 3: Preparation of Composite Cathode/Oxygen Blocking Layer Structure (Carbon:Electrolyte=1:2.4)

A stack structure was prepared in the same manner as in Example 1, except that a weight ratio of the porous material to the electrolyte in the whole composite cathode was changed to 1:2.4.

Example 4: Preparation of Composite Cathode/Oxygen Blocking Layer Structure (PEO was Used as Electrolyte)

A stack structure was prepared in the same manner as in Example 1, except that an ion conductive polymer electrolyte was used as an electrolyte instead of the ionic liquid electrolyte.

1.15 g of PEO (Mw=100,000, Aldrich, 181986) was dissolved in 50 mL of acetonitrile to prepare a PEO solution, and LiTFSI was added thereto so that a molar ratio of [EO]:[Li] was 10:1. Then, after stirring and dissolving the mixture, the solution was poured on a Teflon dish, dried at room temperature in a drying chamber for 2 days, and then vacuum-dried at a temperature of 60° C. overnight to use the film from which solvent is removed as an ion conductive polymer electrolyte.

Comparative Example 1: Composite Cathode Formed of First Cathode Layer (where, Second Cathode Layer was Omitted)

A stack structure was prepared in the same manner as in Example 1, except that preparation of the second cathode layer was omitted.

A loading amount of the composite cathode was about 3.8 mg/cm$^2$, and a thickness was about 34 μm. In the whole composite cathode, a weight ratio of the porous material (MWCNT) and the electrolyte (ionic liquid electrolyte) was 1:3.

Comparative Example 2: Preparation of Composite Cathode/Oxygen Blocking Layer Structure (where, Second Cathode Layer was Omitted, and Carbon:Electrolyte in the First Cathode Layer was 1:2)

A composite cathode was prepared in the same manner as in Comparative Example 1, except that a weight ratio of the porous material (MWCNT) to the electrolyte (ionic liquid electrolyte) in the whole composite cathode was changed to 1:2.

However, during preparation of the composite cathode formed of the first cathode layer, cracks were formed in the composite cathode layer, and thus preparation of the composite cathode was impossible.

(Preparation of Lithium Air Battery)

Example 5: Manufacture of Lithium Air Battery

Figure 2:
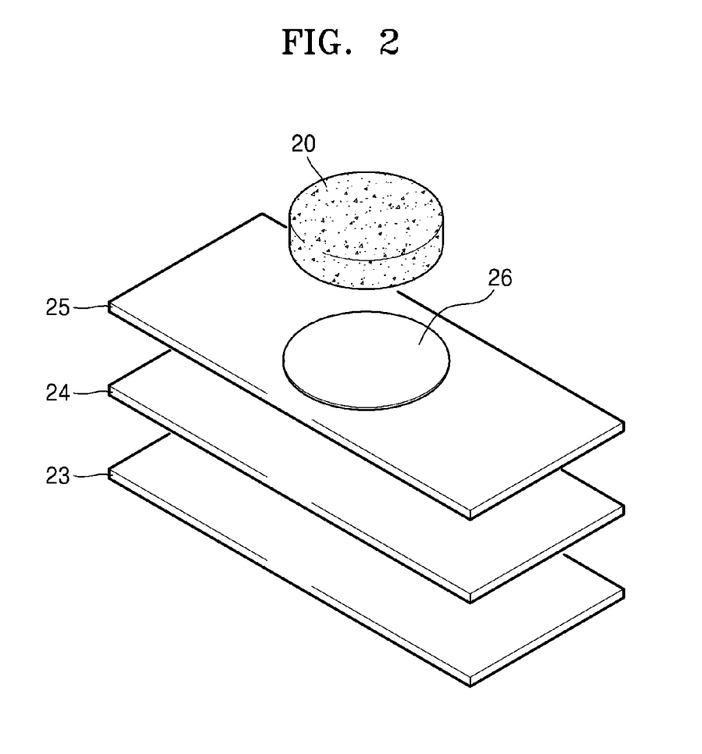
FIG. 2 is a schematic view illustrating a structure of a lithium air battery prepared in Example 5.

As an anode 23, a brushed lithium metal was attached on a copper foil (Cu foil), and, as an anode interlayer 24, a 15% SiO$_2$-PEO layer was used to prevent direct contact between LICGC™ (LATP), which is an oxygen blocking layer 25, and lithium metal. Here, the 15% SiO$_2$-PEO layer was prepared as follows.

PEO (Mw 600,000), Nano SiO$_2$, and LiTFSI were added to 100 mL of acetonitrile and mixed therein for 12 hours. A molar ratio of the LiTFSI to PEO was 1:18, and an amount of SiO$_2$ in the SiO$_2$-PEO layer was 15 weight %.

The lithium metal anode 23 and the anode interlayer 24 were stacked, and the composite cathode 26/oxygen blocking layer 25 stack structure prepared in Example 1 were disposed thereon to prepare a cell having a structure shown in FIG. 2. As shown in FIG. 2, the LATP electrolyte 25, which is an oxygen blocking layer, was placed adjacent to the anode interlayer 24.

Carbon paper (35 BA, available from SGL) was disposed on the opposite surface of the composite cathode 26 as a gas diffusion layer 20, and a current collector (not shown) was disposed as a Ni mesh on the gas diffusion layer to prepare a lithium air battery.

Examples 6 to 8: Preparation of Lithium Air Batteries

A lithium air battery was prepared in the same manner as in Example 1, except that the stack structures prepared in Examples 2 to 4 were each used instead of the stack structure prepared in Example 1.

Comparative Example 3: Preparation of Lithium Air Battery

A lithium air battery was prepared in the same manner as in Example 1, except that the stack structure prepared in Comparative Example 1 was used instead of the stack structure prepared in Example 1.

Evaluation Example 1: Charging/Discharging Characteristics Evaluation

Figure 3:
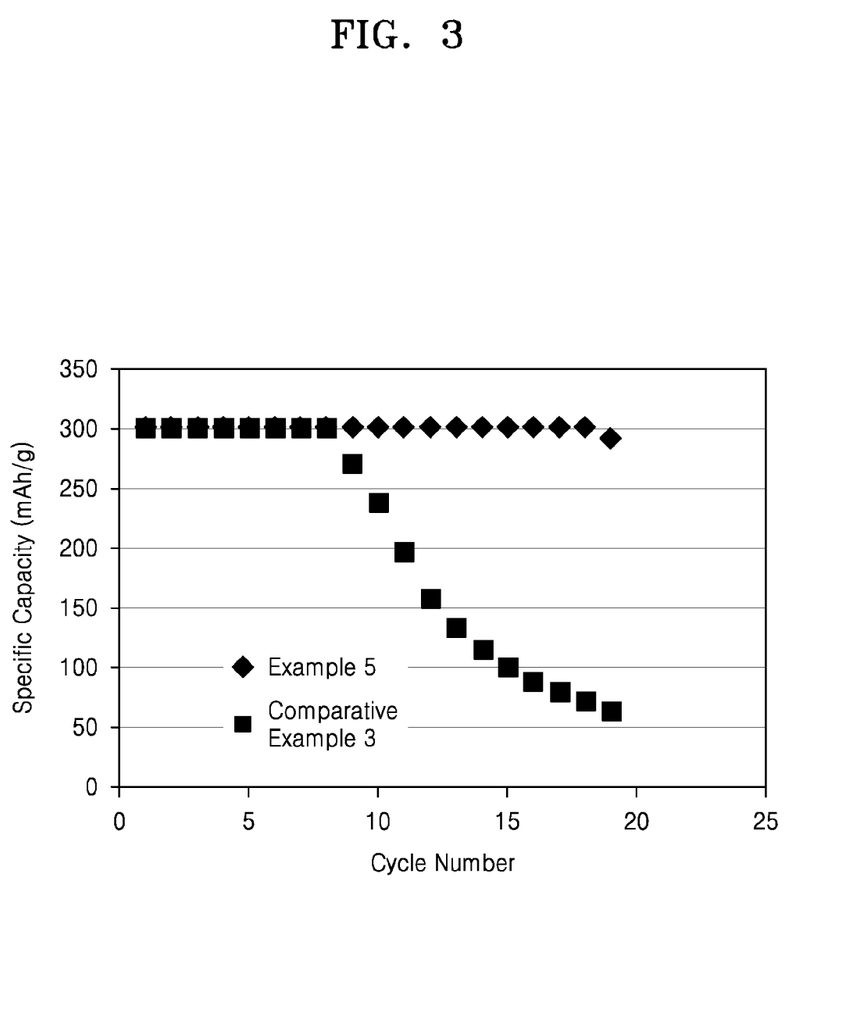
FIG. 3 is a graph of specific capacity (milliampere-hours per gram, mAh/g) versus cycle number showing life characteristics of lithium air batteries prepared in Example 5 and Comparative Example 3.

The lithium air batteries prepared in Examples 5 to 8 and Comparative Example 3, at 60° C., 1 atom, and in an oxygen atmosphere, were discharged with a constant current of 0.24 mA/cm² until a voltage reached 1.7 V (vs. Li) or 300 mAh/g, charged with a constant current of 0.24 mA/cm² until a voltage reached 4.2 V, and then charged with a constant voltage until a charging current was reduced to 0.02 mA/cm², and thus a charging/discharging cycle was performed. Some of the results of the charging/discharging test are shown in Table 1 and FIGS. 3 and 4. A unit weight of in a discharge capacity is a weight of a cathode including a porous material, an electrolyte, and a binder. A lifespan of the battery was evaluated by the number of cycles before reaching a target discharge capacity, which was 80% of 300 mAh/g or lower.

TABLE 1

|  | Number of cycles |
| --- | --- |
| Example 5 | 20 |
| Example 6 | 16 |
| Example 7 | 9 |
| Comparative Example 3 | 5 |

As shown in Table 1, the lithium air batteries prepared in Examples 5 to 7 had improved lifespan characteristics compared to that of the lithium air battery prepared in Comparative Example 3.

It is deemed that the improvement in lifespan characteristics of the lithium air battery of Examples 5 to 7 was caused by a significant squeeze out phenomenon, in which an electrolyte is pushed outside the electrode during a discharging process but does not return during a charging process, in the lithium air battery of Comparative Example 3 due to the discharge products generated during the discharging of the lithium air battery.

Figure 4:
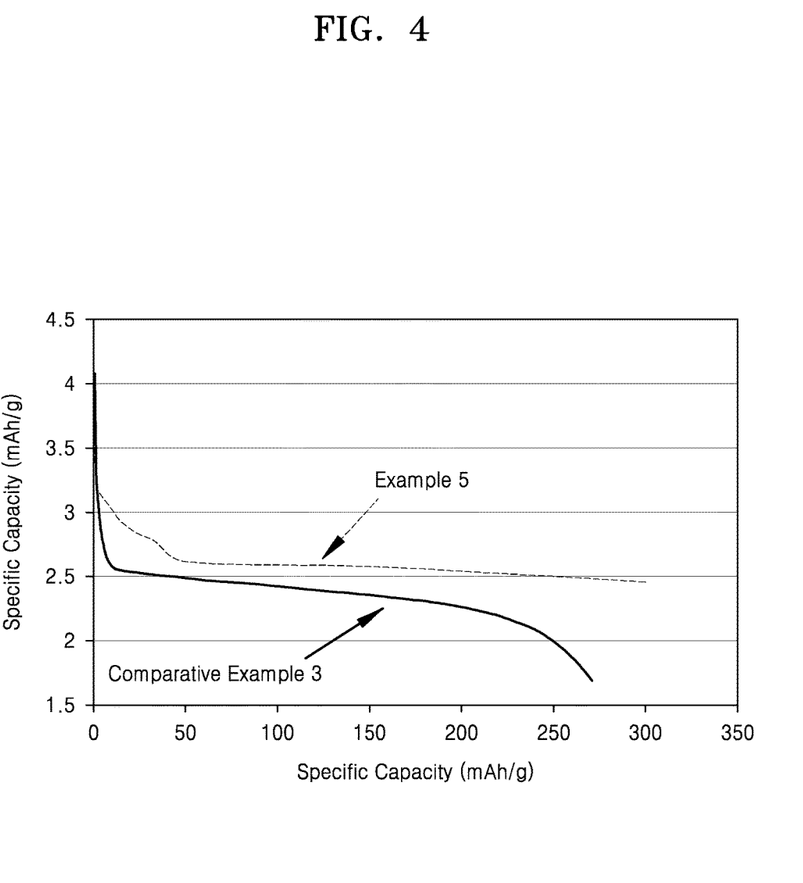
FIG. 4 is a graph of cell voltage (volts, V) versus specific capacity (mAh/g) for a $9^{th}$ discharge cycle of the lithium air batteries prepared in Example 5 and Comparative Example 3.

Further, as shown in FIG. 4, the lithium air battery of Example 5 had a higher operating voltage compared to that of the lithium air battery of Comparative Example 3. It is deemed that the improved operating voltage, that is, a lower overvoltage, was the result of a reduced resistance of the lithium air battery due to an increased amount of effective carbon.

As described above, according to the one or more of the above embodiments of the present invention, a lithium air battery includes a composite cathode including a porous material and a first electrolyte, wherein a composition ratio of the porous material to the first electrolyte is less than 1:3 by weight, and thus charging/discharging characteristics of the lithium air battery may improve.

It should be understood that exemplary embodiments described herein should be considered in a descriptive sense only and not for purposes of limitation. Descriptions of features, advantages, or aspects within each embodiment should typically be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium air battery comprising:
a composite cathode comprising first cathode layer comprising a porous material and a first electrolyte;
an anode comprising lithium metal; and
an oxygen blocking layer disposed between the composite cathode and the anode, wherein a content of the first electrolyte in the composite cathode is less than about 75 weight percent, based on a total weight of the first electrolyte and the porous material, and
wherein the composite cathode has a concentration gradient of the first electrolyte from a first surface of the composite cathode which is adjacent to the oxygen blocking layer to a second surface of the of the composite cathode which is opposite to the first surface of the composite cathode.

2. A lithium air battery comprising:
a composite cathode comprising first cathode layer comprising a porous material and a first electrolyte;
an anode comprising lithium metal;
an oxygen blocking layer disposed between the composite cathode and the anode; and
a second cathode layer on a surface of the first cathode layer which is opposite the oxygen blocking layer, wherein the second cathode layer does not comprise an electrolyte,
wherein a content of the first electrolyte in the composite cathode is less than about 75 weight percent, based on a total weight of the first electrolyte and the porous material.

3. The lithium air battery of claim 2, wherein the content of the first electrolyte in the composite cathode is about 1 weight percent to less than about 75 weight percent, based on a total weight of the first electrolyte and the porous material.

4. The lithium air battery of claim 3, further comprising a third cathode layer on a surface of the second cathode layer which is opposite the oxygen blocking layer, wherein the third cathode layer does not comprise an electrolyte.

5. The lithium air battery of claim 2, wherein the composite cathode has a concentration gradient of the first electrolyte from a first surface of the composite cathode which is adjacent to the oxygen blocking layer to a second surface of the of the composite cathode which is opposite to the first surface of the composite cathode.

6. The lithium air battery of claim 5, wherein, in the composite cathode, a concentration of the first electrolyte at the first surface of the composite cathode is greater than a concentration of the first electrolyte at the second surface of the composite cathode.

7. The lithium air battery of claim 2, wherein a capacity retention ratio of the lithium air battery is about 50% or greater after 19 cycles of charging and discharging at a cut-off discharge capacity of about 300 milliampere-hours per gram or at a cut-off discharge voltage of about 1.7 volts.

8. The lithium air battery of claim 2, wherein the first electrolyte is a solid electrolyte, a liquid electrolyte, or a combination thereof.

9. The lithium air battery of claim 2, wherein the first electrolyte comprises an organic solvent, an ionic liquid, a polymeric ionic liquid, an ion conductive polymer, an ion conductive inorganic material, or a combination thereof, and a lithium salt.

10. The lithium air battery of claim 9, wherein the ionic liquid is represented by Formula 1 or 2:

Formula 1 wherein, in Formula 1, denotes a C2-C30 ring having 3 atoms to 31 atoms including a hetero atom, and wherein the C2-C30 ring is a cycloalkyl ring, an aryl ring, or a heteroaryl ring, X is —N($R_2$)($R_3$), —N($R_2$), —P($R_2$), or —P($R_2$)($R_3$), and $Y^-$ is $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, or a combination thereof, Formula 2 wherein, in Formula 2,

X is —N($R_2$)($R_3$)($R_4$), —N($R_2$)($R_3$), —P($R_2$)($R_3$), or —P($R_2$)($R_3$)($R_4$), $R^{11}$ is an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkyleneoxide group, and $Y^-$ is $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, or a combination thereof.

11. The lithium air battery of claim 10, wherein in Formula 1 is a cation represented by Formula 3, and wherein in Formula 2 is a cation represented by Formula 4:

Formula 3 wherein, in Formula 3,

Z denotes N or P, and $R_{12}$ to $R_{18}$ are each independently a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkyleneoxide group, Formula 4 wherein, in Formula 4,

Z denotes N or P, and $R_{12}$ to $R_{15}$ are each independently a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, an unsubstituted or substituted C3-C30 heterocycloalkyl group, or an unsubstituted or substituted C2-C100 alkyleneoxide group.

12. The lithium air battery of claim 9, wherein the ion conductive inorganic material is a glass, an amorphous metal, a ceramic, a glass ceramic, or a combination thereof.

13. The lithium air battery of claim 9, wherein the ion conductive inorganic material is $BaTiO_3$, $Pb(Zr_mTi_{(1-m)})O_3$ wherein $0 \leq m \leq 1$, $Pb_{1-x}La_xZr_{1-y}Ti_yO_3$ wherein, $0 \leq x < 1$ and $0 \leq y < 1$, $Pb(Mg_{3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate, $Li_xTi_y(PO_4)_3$ wherein $0 < x < 2$ and $0 < y < 3$, $Li_xAl_yTi_z(PO_4)_3$ wherein $0 < x < 2$, $0 < y < 1$, and $0 < z < 3$, $Li_{1+x+y}(Al_mGa_{(1-m)})_x(Ti_nGe_{(1-n)})_{2-x}Si_yP_{3-y}O_{12}$ wherein $0 \leq m \leq 1$, $0 \leq n \leq 1$, $0 \leq x \leq 1$, and $0 \leq y \leq 1$, $Li_xLa_yTiO_3$ wherein $0 < x < 2$ and $0 < y < 3$, $Li_xGe_yP_zS_w$ wherein $0 < x < 4$, $0 < y < 1$, $0 < z < 1$, and $0 < w < 5$, $Li_xN_y$ wherein $0 < x < 4$ and $0 < y < 2$, an $SiS_2$ glass of formula $Li_xSi_yS_z$ wherein $0<x<3$, $0<y<2$, and $0<z<4$, a $P_2S_5$ glass of the formula $Li_xP_yS_z$ wherein $0<x<3$, $0<y<3$, and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic, and $Li_{3+x}La_3M_2O_{12}$ wherein M is Te, Nb, or Zr, or a combination thereof.

14. The lithium air battery of claim 9, wherein the ion conductive polymer comprises an ion conductive repeating unit derived from an ether monomer, an acryl monomer, a methacryl monomer, and a siloxane monomer, or a combination thereof.

15. The lithium air battery of claim 9, wherein the ion conductive polymer is polyethyleneoxide, polypropyleneoxide, polymethylmethacrylate, polyethylmethacrylate, polydimethylsiloxane, polyacrylic acid, polymethacrylic acid, polymethylacrylate, polyethylacrylate, poly-2-ethylhexylacrylate, polybutylmethacrylate, poly-2-ethylhexylmethacrylate, polydecylacrylate, polyethylvinylacetate, or a combination thereof.

16. The lithium air battery of claim 2, wherein the porous material of the composite cathode comprises carbon.

17. The lithium air battery of claim 2, wherein the oxygen blocking layer is impervious with respect to oxygen.

18. The lithium air battery of claim 2 further comprising an anode interlayer disposed between the anode and the oxygen blocking layer.

19. The lithium air battery of claim 2, wherein the first electrolyte is a liquid electrolyte.

20. A method of manufacturing a lithium air battery, the method comprising:
  disposing a composite cathode comprising a first cathode layer comprising a porous material and a first electrolyte on an oxygen blocking layer;
  disposing a second cathode layer on a surface of the first cathode layer which is opposite the oxygen blocking layer, wherein the second cathode layer does not comprise an electrolyte; and
  disposing an anode comprising lithium metal on a surface of the oxygen blocking layer which is opposite the composite cathode to manufacture the lithium air battery,
  wherein a content of the first electrolyte in the composite cathode is less than about 75 weight percent, based on a total weight of the first electrolyte and the porous material.

* * * * *